United States Patent [19]

Chi

[11] Patent Number: 5,800,071
[45] Date of Patent: *Sep. 1, 1998

[54] JOURNAL FOR A HEAD TUBE OF A BICYCLE

[76] Inventor: Yi-Chen Chi, No. 139-5, An Mei Road, Hou Li Hsiang, Taichung, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 759,433

[22] Filed: Dec. 5, 1996

[51] Int. Cl.⁶ .................... F16C 33/58; F16C 43/00; F16C 13/00
[52] U.S. Cl. .................... 384/514; 384/538; 384/540; 384/545
[58] Field of Search .................... 384/513, 514, 384/540, 544, 545, 538

[56] References Cited

U.S. PATENT DOCUMENTS

| | | | |
|---|---|---|---|
| 3,667,097 | 6/1972 | Germann | 384/544 |
| 4,934,839 | 6/1990 | Chi | 384/513 |
| 5,163,758 | 11/1992 | Chi | 384/540 |
| 5,197,809 | 3/1993 | Chi | 384/540 |
| 5,246,296 | 9/1993 | Chi | 384/540 |
| 5,286,118 | 2/1994 | Chi | 384/545 |
| 5,291,797 | 3/1994 | Chi | 384/540 |
| 5,303,611 | 4/1994 | Chi | 384/540 |
| 5,405,202 | 4/1995 | Chi | 384/545 |
| 5,509,739 | 4/1996 | Chi | 384/545 |
| 5,544,905 | 8/1996 | Chem | 384/540 |
| 5,573,262 | 11/1996 | Chi | 384/540 |
| 5,575,540 | 11/1996 | Chi | 384/545 |

Primary Examiner—Charles A. Marmor
Assistant Examiner—Matthew A. Kaness
Attorney, Agent, or Firm—Bacon & Thomas

[57] ABSTRACT

A journal for a head tube of a bicycle includes a lower race fitted on an upper end of the head tube through which a steerer tube extends, the lower race having a first annular recess defined therein for receiving a plurality of balls. An upper race is securely mounted on the steerer tube and an annular element is securely disposed between the balls and the lower race. The annular element has a skirt portion extending radially outwardly from an outer periphery thereof which extends above the lower race and a track portion formed on an inner periphery thereof for rotatably receiving the balls therein.

4 Claims, 2 Drawing Sheets

JOURNAL FOR A HEAD TUBE OF A BICYCLE

BACKGROUND OF THE INVENTION

1. Field of the Invention

The present invention relates to a journal and, more particularly, to a journal for a head tube of a bicycle wherein an annular element with a skirt portion is disposed between balls and an upper race.

2. Brief Description of the Prior Art

The prior art of which applicant is aware are his prior U.S. Pat. No. 4,934,839 to Chi, issued Jun. 19, 1990, U.S. Pat. No. 5,163,758 to Chi, issued Nov. 17, 1992 and U.S. Pat. No. 5,246,296 to Chi, issued Sep. 21, 1993. All of the three prior patents include a track element or the like disposed between the balls and the lower race of the journal and a cap or the like having a skirt portion to prevent debris or rain drops from entering between the balls and the lower race. The track element mentioned above needs to be manufactured with separate heat treatment and requires better manufacturing precision so as to permit the balls to smoothly rotate thereon.

The present invention provides an improved journal of a bicycle and which has an annular element with a skirt portion and a track portion formed integrally thereto such that the above mentioned problems can be mitigated and/or obviated.

SUMMARY OF THE INVENTION

In one aspect of the present invention, there is provided a journal for a head tube of a bicycle. The bicycle has a steerer tube extending through the head tube thereof with the journal disposed between the steerer tube and the head tube. The journal comprises a lower race fitted on an upper end of the head tube and the lower race has a first annular recess defined therein for a plurality of balls to be rotatably received therein.

An upper race is securely mounted to the steerer tube and an annular element is securely disposed between the balls and the upper race. The annular element has a skirt portion extending radially outwardly and downwardly from an outer periphery thereof and a track portion formed on an inner periphery thereof such that the balls are received between the first annular recess and the track portion.

It is an object of the present invention to provide a journal which includes an annular element disposed between the balls and the upper race.

It is another object of the present invention to provide an annular element of the journal. The annular element has a skirt portion extending radially outwardly from an outer periphery thereof and extending above the lower race of the journal, and a track portion is formed in an inner periphery thereof for receiving the balls.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
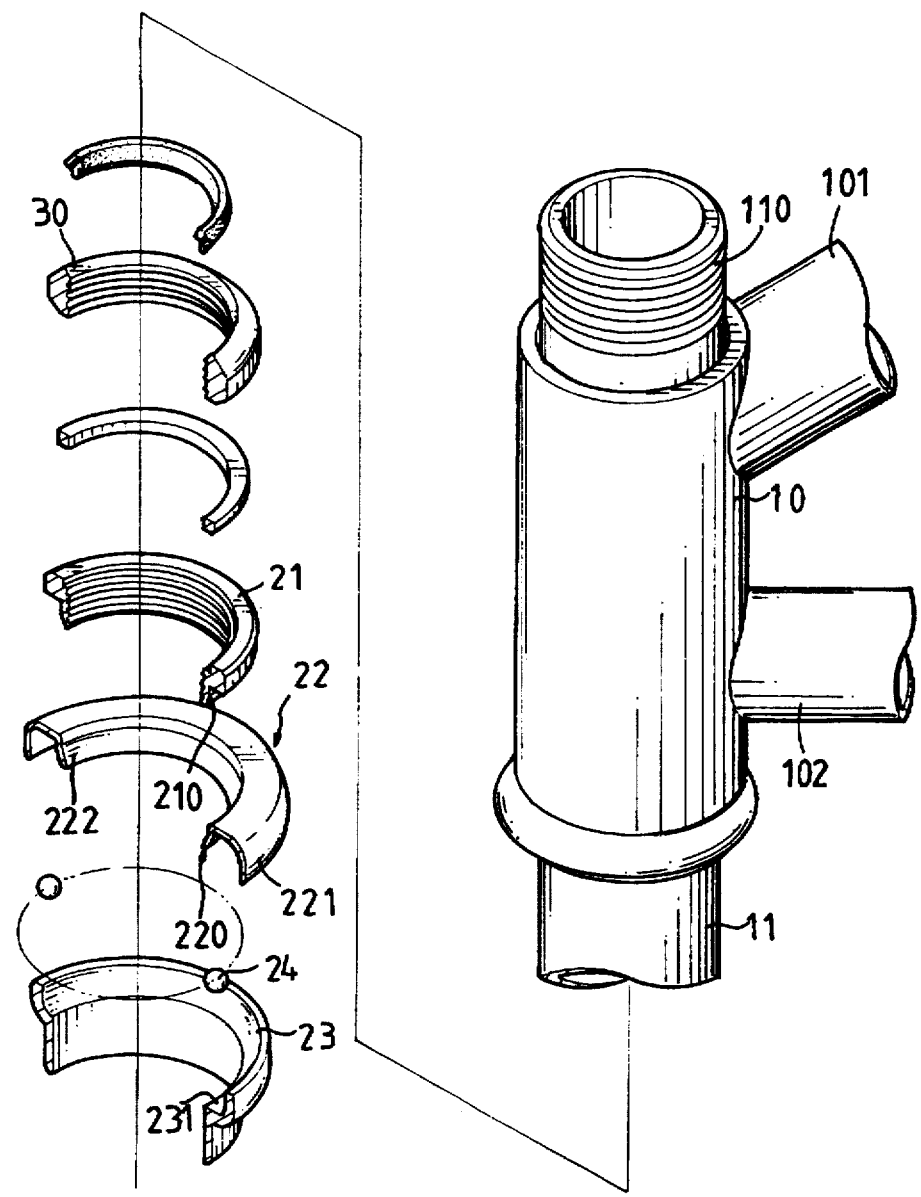
FIG. 1 is an exploded view of a journal in accordance with the present invention.
Figure 2:
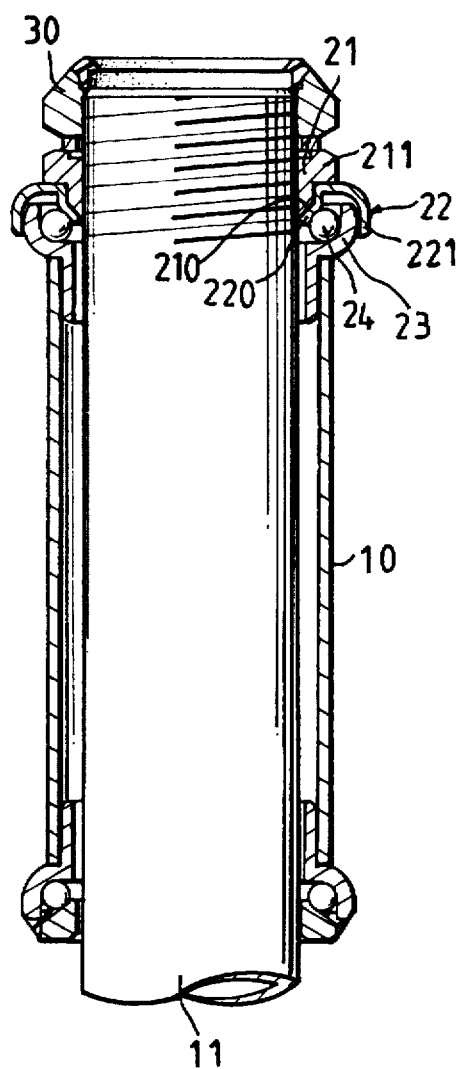
FIG. 2 is a side elevational view, partly in section, of the journal in accordance with the present invention.

Referring to the drawings and initially to FIGS. 1 and 2, a conventional bicycle (not shown) includes a head tube 10 from which a top tube 101 and a down tube 102 are respectively connected thereto. A steerer tube 11 rotatably extends through the head tube 10 and has a threaded portion 110 defined in an outer periphery of a top end thereof. A journal in accordance with the present invention generally includes a lower race 23 fitted on an upper end of the head tube 10 and the lower race 23 has a first annular recess 231 defined therein. Similarly, the journal is also suitable for being disposed on the lower portion of the head tube 10.

A plurality of balls 24 are rotatably received in the first annular recess 231 of the lower race 23. An upper race 21 is securely and threadedly engaged with the threaded portion 110 of the steerer tube 11. The upper race 21 has a first inclined surface 210 defined in a bottom end thereof and a flange 211 extending radially outwardly therefrom.

An annular element 22 is securely disposed between the balls 24 and the upper race 21, the annular element 22 having a skirt portion 221 extending radially outwardly and downwardly from an outer periphery thereof so as to let the lower race 23 be partially covered by the skirt portion 221 and a track portion 220 formed on an inner periphery thereof. The skirt portion 221 is partially pressed by the flange 211 of the upper race 21. Balls 24 are received between the first annular recess and the track portion 220. The track portion 220 of the annular element 22 has a second inclined surface 222 defined in an upper surface thereof for engagement by with the first inclined surface 210 of the upper race 21 when the upper race 21 exerts a force against the annular element 22. Because of inclined surfaces 210 and 222, this force is both downward and radially outward in direction, thereby creating an annular gap between annular element 22 and the steerer tube 11 and resulting in a more secure positioning of annular element 22.

A force exerting element 30 is threadedly and securely mounted on the threaded portion 110 of the steerer tube 11 to exert a downward force to an upper surface of the upper race 21 so as to maintain the balls 24 in position.

Accordingly, the annular element 22 of the invention combines a skirt portion 221 to prevent rain drops or debris from entering the journal and a track portion 220 with cooperating the first annular recess 231 of the lower race 23 to receive balls 24. This reduces the number of elements required for the journal and manufacturing cost.

Although the invention has been explained in relation to its preferred embodiment, it is to be understood that many other possible modifications and variations can be made without departing from the spirit and scope of the invention as hereinafter claimed.

What is claimed is:

1. A journal assembly for bicycle, said journal assembly comprising:

a head tube, a steerer tube rotatable extending through said head tube, the steerer tube including a threaded top end;

a lower race fitting on an upper end of said head tube and having a first annular recess defined therein;

a plurality of balls rotatably received in said first annular recess of said lower race;

a threaded upper race in threaded engagement with the threaded top end of said steerer tube and having a first inclined surface defined in a bottom end thereof, and an annular element securely disposed between said balls and said upper race, said annular element having a skirt portion extending radially outwardly and downwardly from an outer periphery thereof and a track portion formed on an inner periphery thereof such that said balls are received between said first annular recess and said track portion, said track portion of said annular element having a second inclined surface defined in an upper surface thereof for engagement by said first inclined surface of said upper race, said engagement between said first and said second inclined surfaces being realized from a force applied by said upper race in a downward and radially outward direction for defining an annular gap between said annular element and said steerer tube.

2. The journal assembly as claimed in claim 1 further including a force exerting element for threaded engagement with the threaded top end of said steerer tube to exert a downward force to said upper race.

3. The journal assembly as claimed in claim 1 wherein said upper race further includes a flange extending radially outwardly therefrom for pressing onto said annular element.

4. The journal assembly as claimed in claim 1 wherein said skirt portion of said annular element extends downwardly and outwardly and above said lower race such that said lower race is partially covered by said skirt portion.

* * * * *